United States Patent
Pedretti-Rodi et al.

(10) Patent No.: US 10,850,427 B2
(45) Date of Patent: Dec. 1, 2020

(54) METHOD AND SYSTEM FOR PRODUCING A CONCRETE WORK PIECE PRESTRESSED BY REINFORCEMENT

(71) Applicant: Synrocks SA, Lugano (CH)

(72) Inventors: Andrea Pedretti-Rodi, Bellinzona (CH); Giovanni Martinola, Buchs (CH)

(73) Assignee: Synrocks SA, Lugano (CH)

( * ) Notice: Subject to any disclaimer, the term of this patent is extended or adjusted under 35 U.S.C. 154(b) by 637 days.

(21) Appl. No.: 15/329,872

(22) PCT Filed: Jul. 28, 2015

(86) PCT No.: PCT/CH2015/000112
§ 371 (c)(1),
(2) Date: Jan. 27, 2017

(87) PCT Pub. No.: WO2016/015166
PCT Pub. Date: Feb. 4, 2016

(65) Prior Publication Data
US 2017/0266841 A1   Sep. 21, 2017

(30) Foreign Application Priority Data
Jul. 28, 2014 (CH) ........................ 1154/14

(51) Int. Cl.
| | | |
|---|---|---|
| *B28B 23/04* | (2006.01) | |
| *E04C 5/08* | (2006.01) | |
| *B28B 11/24* | (2006.01) | |
| *E04C 3/26* | (2006.01) | |
| *E04C 5/07* | (2006.01) | |
| *B28B 23/06* | (2006.01) | |
| *F24S 25/00* | (2018.01) | |
| *B28B 1/52* | (2006.01) | |
| *E04C 5/01* | (2006.01) | |
| *F24S 80/00* | (2018.01) | |
| *F24S 25/11* | (2018.01) | |
| *F24S 23/71* | (2018.01) | |

(52) U.S. Cl.
CPC ............. *B28B 23/046* (2013.01); *B28B 1/52* (2013.01); *B28B 11/245* (2013.01); *B28B 23/04* (2013.01); *B28B 23/043* (2013.01); *B28B 23/06* (2013.01); *E04C 3/26* (2013.01); *E04C 5/012* (2013.01); *E04C 5/073* (2013.01); *E04C 5/08* (2013.01); *E04C 5/085* (2013.01); *F24S 25/00* (2018.05); *F24S 23/71* (2018.05); *F24S 25/11* (2018.05); *F24S 2080/012* (2018.05)

(58) Field of Classification Search
CPC ..... B28B 23/04; B28B 23/043; B28B 23/046; B28B 23/06; E04C 3/26; E04C 5/08; F24S 2080/012
See application file for complete search history.

(56) References Cited

U.S. PATENT DOCUMENTS

| | | | | |
|---|---|---|---|---|
| 3,086,273 A * | 4/1963 | Welborn | .................. | E04C 5/08 264/228 |
| 3,790,394 A * | 2/1974 | Magnan | ................. | C04B 14/04 106/692 |
| 4,205,029 A * | 5/1980 | Forrest | ................. | B28B 23/046 264/228 |
| 6,387,310 B1 * | 5/2002 | Iizuka | .................. | C04B 41/009 264/228 |
| 9,145,337 B2 * | 9/2015 | Tanaka | .................... | C04B 28/04 |
| 9,758,968 B2 * | 9/2017 | Leinenbach | ............ | E04G 21/12 |
| 2013/0239503 A1 * | 9/2013 | Miller | ................. | C04B 20/0068 52/414 |
| 2013/0303662 A1 * | 11/2013 | Guzzetta | ................. | C04B 28/02 524/5 |

FOREIGN PATENT DOCUMENTS

| | | | |
|---|---|---|---|
| CN | 104060768 A * | 9/2014 | |
| DE | 4428987 A1 | 2/1996 | |
| EP | 0197236 A2 | 10/1986 | |
| FR | 2505022 A1 | 11/1982 | |
| GB | 1326943 A | 8/1973 | |

(Continued)

OTHER PUBLICATIONS

Righetti, Roberto, International Search Report for PCT/CH2015/000112, dated Sep. 29, 2015 [3 pages].

(Continued)

*Primary Examiner* — Atul P. Khare
(74) *Attorney, Agent, or Firm* — Winstead PC (57) ABSTRACT

The method according to the invention for producing a prestressed concrete workpiece is characterized in that the prestress is created by a heat treatment, wherein the concrete and the reinforcement therefor are selected in such a way that, when cooling the concrete workpiece from an elevated temperature, the heat expansion coefficient of the concrete is less than that of the reinforcement, and in that, during cooling, the concrete and the reinforcement adhere sufficiently strongly to one another if, during cooling, the concrete is hydrated at least to such an extent in order to be able to expand the reinforcement on account of the different heat expansion coefficients, and in that the concrete, together with the reinforcement, is brought to the elevated temperature in such a way that and is hydrated during cooling at least to such an extent that it is prestressed by the reinforcement after cooling.

20 Claims, 10 Drawing Sheets

(56) References Cited

FOREIGN PATENT DOCUMENTS

GB     2358880 A   8/2001
JP     2004 092333 A   3/2004

OTHER PUBLICATIONS

Kühne, Hans-Carsten et al; "Properties of Heat and Steam Cured Ultra High Performance Concrete (UHCP)"; Federal Institute for Material Research and Testing.
Yazici, Halit et al.; "Mechanical Properties of Reactive Powder Concrete Containing Mineral Admixtures Under Different Curing Regimes"; Construction and Building Materials 23; pp. 1223-1231; 2009.

* cited by examiner

Fig 1

Prior Art

Fig 6 c

METHOD AND SYSTEM FOR PRODUCING A CONCRETE WORK PIECE PRESTRESSED BY REINFORCEMENT

The present invention relates to a method for manufacturing a concrete workpiece prestressed by a reinforcement, as well as to a concrete workpiece.

The lack of tensile loading capacity of concrete is often improved by prestressed concrete, wherein manufacturing a prestressed concrete workpiece is complicated despite the plurality of possible prestresses, since use must be made of a prestressing bed, or of a tie rod to be arranged on the workpiece and to be activated after hydrating the concrete, for example. As a consequence, prestressed concrete workpieces cannot be manufactured with the frequently desired lean or even complicated geometric configuration, which would in itself be conceivable by casting the fresh concrete into a corresponding mold.

The tensile strength was increased in addition to the compressive strength in the area of ultrahigh performance concrete (UHCP), see for example the publication "Properties of Heat Treated Ultrahigh-Strength Concrete (UHCP)" by Hans Carsten Kühne, Federal Institute for Material Research and Testing, or also the publication "Mechanical Properties of Reactive Powder Concrete containing Mineral Admixtures under Different Curing Regimes", Halit Yazici, Mert Yardimci, Serdar Aydin and Anil Karabulut, Construction and Building Materials, 23 (2009), pages 1223-1231. Heat treating the UHCP specimens yielded compressive strengths in a range of 200 MPa according to these publications, while the (centric) tensile strength could not be increased to above the 20 MPa, which is respectable for the area of concrete. However, such values for the tensile strength of concrete are still far removed from the tensile strength of metals, for example, so that the area of application even for UHCP workpieces is extremely limited in this regard, and will remain so, which is unfortunate particularly with regard to the lower costs of concrete by comparison to metal, for example.

Accordingly, the object of the present invention is to provide concrete workpieces that exhibit a high tensile strength, in particular bending tensile strength, and, if needed, can also be designed with a lean or complicated geometric shape.

Because the composite of fresh concrete with its reinforcement is cooled down from an elevated temperature, both the concrete and reinforcement are subjected to a thermal expansion (which here is a shrinkage in the case of cooling), wherein the concrete shrinks to less of an extent than the reinforcement, since its thermal expansion coefficient $\alpha_1$ is smaller.

Since the concrete and reinforcement adhere to each other, the reinforcement is prevented during the cooling process from shrinking freely, and hence to a greater extent than the concrete (which it in itself should do thanks to its larger thermal expansion coefficient $\alpha_T$), and thereby correspondingly stretched by the latter, as a result of which the reinforcement in turn exerts a pressure on the concrete that corresponds to its stretching, i.e., prestresses the latter. To this end, the concrete must of course be respectively hydrated, i.e., cured, to at least an extent that it can absorb the pressure generated by the current stretching, at least to an extent that an expansion of the reinforcement remains behind.

This yields a prestress of the concrete with the known advantages of a prestressed concrete workpiece with respect to the tensile or bending tensile loading capacity, without a prestressing bed or adjustable tie rod being necessary to prestress the concrete.

As a result, a reinforcement with whatever configuration desired can be easily placed in a mold filled with fresh concrete, and the thermal treatment according to the invention can be performed. This makes it possible to create the concrete workpiece accordingly without the restrictions on the provided load caused by the conventional prestressing means or prestressing techniques, in particular with respect to the desired progression of the prestressing elements, and also to the outer geometric shape of the concrete workpiece itself.

Therefore, the invention enables the fabrication of prestressed concrete workpieces that can only be manufactured according to prior art with a high outlay, or not at all.

Preferred embodiments of the method according to the invention or the prestressed concrete workpieces according to the invention exhibit the features in the dependent claims.

The invention will be described in even somewhat greater detail below based on the figures.

Figure 1:
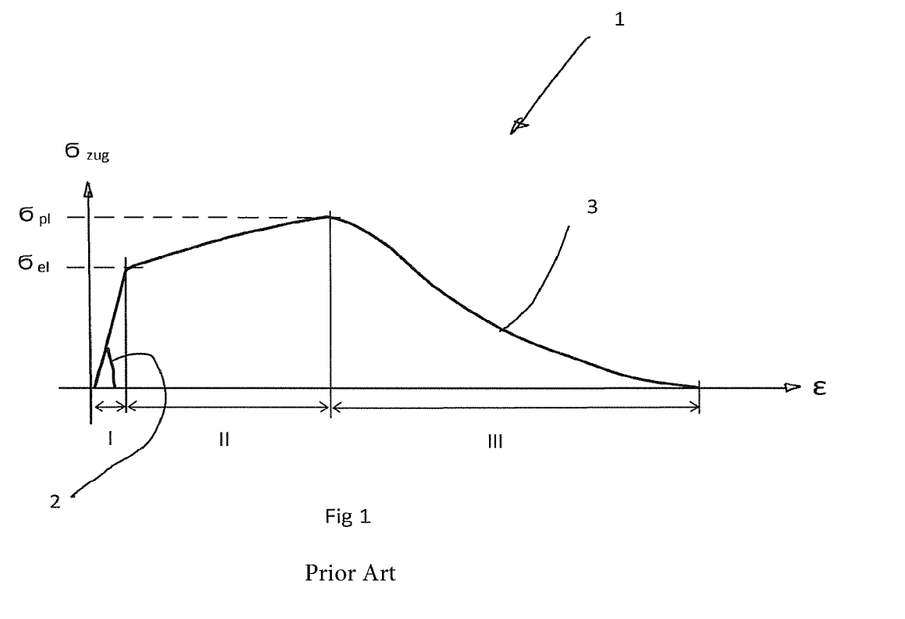
FIG. 1 shows a stress/strain diagram for fiber concrete according to prior art.

FIG. 1 shows a stress/strain diagram 1, wherein the tensile stress $\sigma_{zug}$ is plotted on the vertical axis, and the resulting expansion $\varepsilon$ is plotted on the horizontal axis. Curve 2 here shows the behavior of simple concrete (e.g., a concrete according to the description for FIG. 2), and curve 3 shows the behavior of a fiber-reinforced UHCP concrete, e.g., a concrete as described for FIG. 3. As generally evident, the tensile strength of the conventional concrete does not even remotely approach that of the fiber-reinforced concrete, wherein the much better tensile strength of the fiber-reinforced concrete reaches as high as 20 MPa, depending on the specific concrete mixture and used fibers, although this is still low by comparison to other materials, such as metal. The term "fibers" in a fiber concrete relates generally to non-metallic or metallic fibers with a length of around 60 mm and a diameter of up to approx. 1.0 mm. The fibers comprise a reinforcement for the concrete, exhibit a uniform surface and clearly differ in terms of their dimensions from reinforcements with larger dimensions that no longer can be mixed into the concrete during the manufacture of the fresh concrete with its components, and thus cannot be distributed as uniformly as possible in the concrete, and additionally as a rule have a non-uniform surface with elevations, etc. Fibers will therefore be taken as the basis in describing the present invention, provided they can still be homogeneously distributed in terms of their arrangement and alignment in the fresh concrete through mixing, which as a rule encounters a limit at the dimensions mentioned above. Other reinforcements then no longer consist of fibers.

If a stress is applied to a UHCP concrete, it initially deforms elastically in a first stage (expansion stage I) without crack formation until the tensile stress $\sigma_{el}$ is reached, and then plastically in stage II with the formation of micro-cracks until tensile stress $\sigma_{p1}$. In stage II, the expansion of micro-cracks is prevented by the fibers, which enables a continuous rise in tensile stress $\sigma_{zug}$. Finally, the concrete is destroyed by the continued crack formation in stage III, and the strength collapses (softening).

The invention will be illustrated below using not the (centric) tensile strength, but rather the bending tensile strength, which is used in particular in construction materials, and describes the behavior of a specimen while exposed to perhaps the most frequent load, bending.

Figure 2:
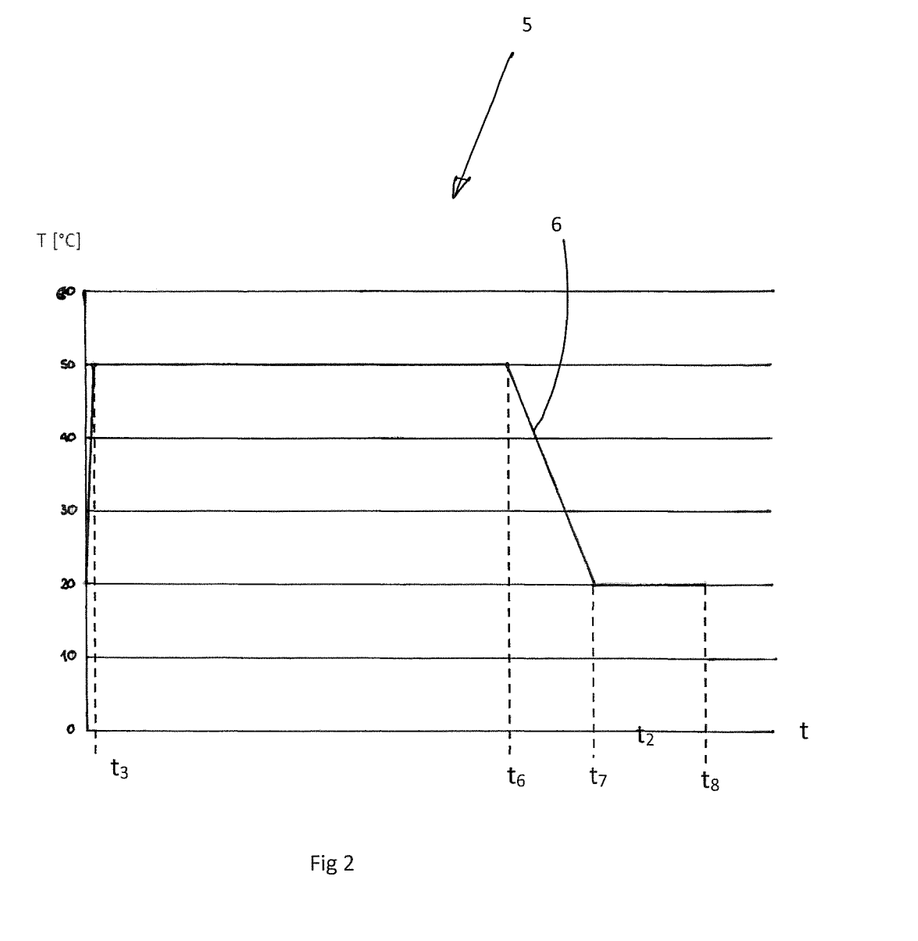
FIG. 2 shows a diagram with a simple temperature profile for implementing the method according to the invention.

FIG. 2 shows a temperature/time diagram 5 for the thermal treatment for manufacturing a prestressed concrete workpiece according to the invention, for example which has a conventional reinforcement of ribbed steel rods, such as steel S500 with a diameter of 6 mm or more with a thermal expansion coefficient $\alpha_T$ within a range of $12 \times 10^{-6}$/K. The vertical axis shows the temperature in ° C., the horizontal axis the elapsed time t in hours h.

For example, the concrete for the thermal treatment described on the figure consists of the following:

| Ingredients | Content [kg/m³] |
|---|---|
| Cement (CEM 1 52.5), e.g., Holcim | 300 |
| Crushed basalt sand 0-4 mm | 900 |
| Basalt 4-8 mm | 390 |
| Admixture 8-16 mm | 825 |
| Super fluidized polycarboxylate ether | 3 |
| Water | 120 |
| Thermal expansion coefficient $\alpha_T$ | Approx. $10 \times 10^{-6}$/K |

According to the temperature curve 6, the concrete workpiece freshly cast at time $t_1$, which contains the reinforcement, is immediately heated to 50° C. at 0.4° C./min, which it reaches at time $t_5$, and thereafter is kept until time $t_6$ at 50° C. for 24 hours, and then cooled at approx. 0.2° C./min, wherein it reaches room temperature once again at time $t_7$, and finally cures for approx. 6 hours until time $t_8$.

In another embodiment, the freshly poured concrete workpiece can be partially hydrated before heated to the elevated temperature for a first dimensional stability, until the concrete preferably exhibits a compressive strength of between 20 MPa and 60 MPa, wherein this partial hydration especially preferably takes place at an ambient temperature. In a specific case, the expert can determine the best possible conditions for this first partial hydration.

It is essential here that the concrete still be deformable enough while being heated as to enable a relative displacement between it and the reinforcement, which allows the reinforcement to expand thanks to its higher thermal coefficient relative to the concrete. The concrete is then hydrated in this state to an extent where no relative displacement is possible any longer in the cooling processes ($t_6$ to $t_7$), i.e., the concrete can absorb pressure from the stretched reinforcement during subsequent cooling up until time $t_7$, and is prestressed to reflect this pressure.

In the present specification, times $t_1$ to $t_6$ are uniformly used for the same procedural steps, so that diagram 5 on FIG. 2 with a simple embodiment of the present invention lacks the times $t_2$ to $t_4$ for other, preferred but not mandatory procedural steps according to other embodiments.

It turns out that the concrete and reinforcement for thermal treatment are selected in such a way that the thermal expansion coefficient $\alpha_T$ of the concrete is smaller than that of the reinforcement while cooling the concrete workpiece from an elevated temperature, see the thermal expansion coefficients $\alpha_T$ specified above for the concrete and reinforced steel.

The selection further takes place in such a way that the concrete and reinforcement adhere to each other strongly enough in the cooling process when the concrete has been hydrated in the cooling process to at least an extent where the reinforcement can be expanded owing to the varying thermal expansion coefficients. For example, this is here the case given the selection of ribbed steel S500, which is known in the art as reinforcement for concrete. The ribs and concrete together yield a positive connection, which leads to the required adhesion given sufficient hydration. This is in turn the case if the concrete is kept at the elevated temperature (time interval $t_5$ to $t_6$) long enough, the duration of which can be easily determined by the expert in specific instances based on the design of the concrete workpiece and used materials.

Since the prestress rises during the entire cooling process between $t_6$ and $t_7$, the degree of hydration should have continuously advanced to at least a point where the prestress corresponding to the current temperature can be withstood. If not, the concrete can be damaged, even though a prestress can still be realized according to the invention. Therefore, it is basically not absolutely necessary to realize the complete prestress emanating from the temperature difference $t_7-t_6$.

As a consequence, it ultimately turns out that, after the concrete and reinforcement have been selected as described above, the concrete with the reinforcement is brought to the elevated temperature in such a way and hydrated in the cooling process to at least an extent that it is prestressed by the reinforcement after cooling. Particularly relevant in this simple embodiment is that a certain relative displacement between the concrete and reinforcement be possible during heating to the elevated temperature, i.e., that hydration up to $t_5$ not have advanced too far (a thermal treatment step for heating to an initial temperature can alternatively also be provided, for example; see description to FIG. 3). The more intensively expanding reinforcement must also be prevented from already triggering cracks in the concrete in the heating process that are irreparable. Finally, the concrete workpiece can be kept at the elevated temperature, for example to enable the degradation of stress fields through creep.

In summation, in an embodiment of the method according to the invention, the fresh concrete exhibits the same thermal expansion coefficient for heating to the elevated temperature and for cooling back down from the latter, wherein concrete hydration for heating is kept low enough to permit a relative displacement between the concrete and reinforcement, and wherein cooling takes place with hydration that no longer allows such a relative displacement, so that cooling prestresses the concrete.

As a consequence, hydration after cooling need not be complete, in particular if the elevated temperature is not high owing to the desired low prestress (or for some other reasons), and takes place in the example on FIG. 2 according to temperature curve 6 after cooling is complete at room temperature in time interval $t_7$ to $t_8$ for a longer period.

As mentioned, the surface of the reinforcement in the embodiment according to FIG. 2 is geometrically configured in such a way that a positive connection arises with the surrounding, at least partially hydrated concrete in the direction of the prestress. Let it here be noted (see further below) that the reinforcement can also adhere to the concrete via a frictional or integral connection, or a combination of a positive, frictional or integral connection. In like manner, it is possible to provide a nonmetallic reinforcement, in particular if the elevated temperature still lies at a level tolerable for nonmetallic materials.

Figure 3:
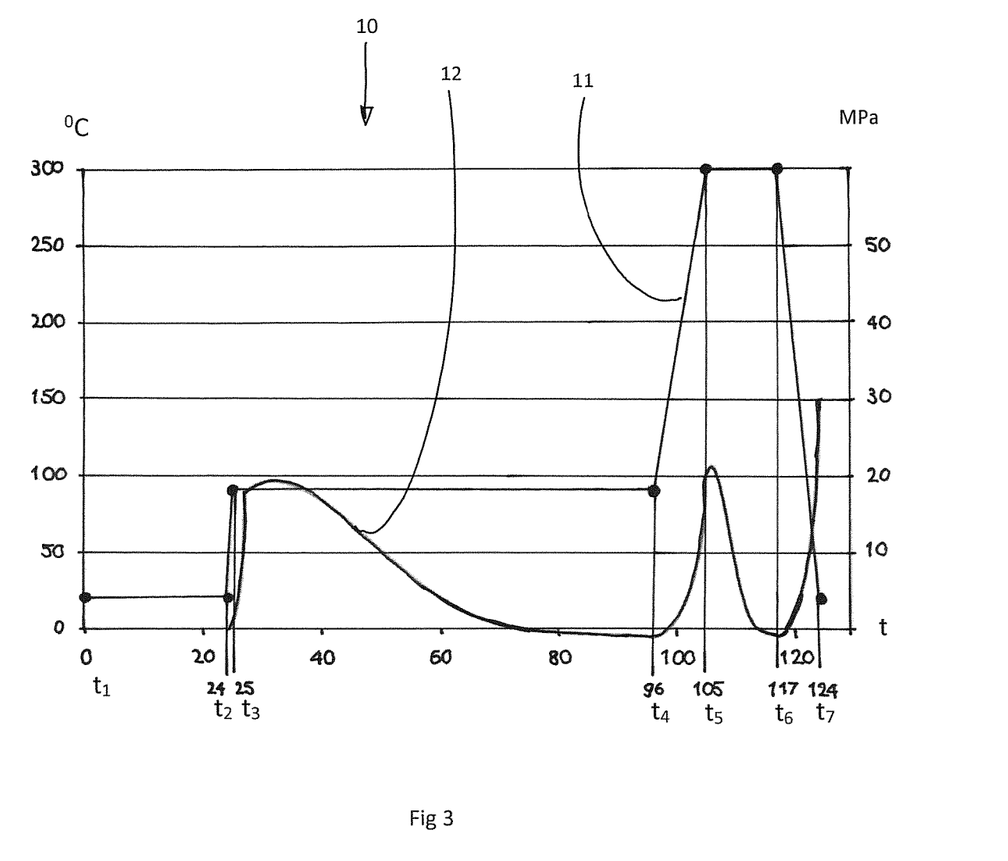
FIG. 3 shows a diagram with a temperature profile for implementing another embodiment of the method according to the invention.

FIG. 3 shows another embodiment of the method according to the invention. Visible is the temperature/time diagram 10 with a temperature curve 11 for manufacturing a prestressed concrete workpiece according to the invention, which here also exhibits a conventional reinforcement comprised of ribbed steel rods, such as steel S500 or even steel B450C having a diameter of 8 mm or more and a thermal expansion coefficient $\alpha_T$ in a range of $12\times10^{-6}$°/K. The vertical axis shows the temperature in ° C. on the left, and the prestress prevailing in the concrete workpiece in MPa on the right, while the horizontal axis shows the elapsed time t in hours.

| Ingredients | Content [kg/m³] |
|---|---|
| Cement CEM I 52.5 R | 1200 |
| Microsilica, for example Elkem MS 971U | 180 |
| Quartz flour 0-100 μm | 180 |
| Spherical quartz sand 0.3-0.9 mm | 415 |
| High-strength steel wire fibers, Ø: 0.14 mm, length: 6 mm | 400 |
| Super fluidized (polycarboxylate ether) | 46 |
| Water | 190 |

In phase 0 (from $t_1$ to $t_2$), the freshly poured concrete workpiece is partially hydrated at room temperature, here for 24 hours, after which it is demolded. The thermal expansion coefficient $\alpha_T$ of the concrete is larger than that of the reinforcement. No prestress is yet present in the concrete workpiece.

In phase 1 (from $t_2$ to $t_3$), the freshly poured concrete workpiece is heated to an initial temperature here measuring 90° C., preferably at 1° C./min.

The concrete expands more strongly than the reinforcement due to the heating, and is already hard enough to expand the latter, thereby already resulting in a first prestress in the concrete. This is shown by the curve 12 for prestress, which the reinforcement exerts on the concrete.

Naturally, the prestress depends on the specific concrete workpiece, since it depends on the ratio between the effective cross sections of the concrete body and the reinforcement; the same concrete body subjected to the same thermal treatment would thus be exposed to a higher prestress if the effective cross sectional surface of the reinforcement were to be enlarged, for example. The exemplarily logged prestress curve 11 here belongs to a specimen of the kind described in conjunction with FIG. 4, curve 26. Therefore, the expert can influence the prestress given the same thermal treatment by configuring the reinforcement.

In phase 2 (from $t_3$ to $t_4$), the concrete workpiece is further partially hydrated at the initial temperature, here for approx. 72 hours. In addition to continued hydration, a first structural conversion takes place in the concrete; it shrinks. As a result, the prestress diminishes again. However, the shrinkage is not so great that the reinforcement could yield an excessive tension in the concrete that might damage the latter. A slight residual prestress remains at the end of phase 2, which is here negative. The structural conversion also causes the thermal expansion coefficient $\alpha_T$ of the concrete to change, as a result of which the expansion coefficient $\alpha_T$ of the concrete and reinforcement move toward each other, and lie close together at the end of phase 2. The most water is hydrated, the concrete is already quite hard. Stress fields in the concrete are degraded by creep.

In phase 3 (from $t_4$ to $t_5$), the concrete workpiece continues to be heated from the initial temperature to the elevated temperature, preferably at approx. 0.4° C./min up to 300° C. The prestress rises again accordingly. While stress fields are here generated in the concrete, it remains essentially or entirely free of cracks, so that the subsequent use of the concrete workpiece is not impeded.

In phase 4 (from $t_5$ to $t_6$), the concrete workpiece is further hydrated at the elevated temperature, here for 12 hours. Another structural conversion associated with a corresponding volume reduction here takes place, and the thermal expansion coefficient $\alpha_T$ of the concrete drops below that of the reinforcement. Creep takes place in the concrete (and also in the reinforcement), and the stress fields are degraded. The prestress once again drops to a low value not damaging to the concrete. The shrinkage given by the volume reduction once again degrades the prestress.

In phase 5 (from $t_6$ to $t_7$), the concrete workpiece is cooled to ambient temperature, preferably at approx. 0.6° C./min. Due to the higher thermal expansion coefficient $\alpha_T$ of the reinforcement, a significant prestress arises in the concrete, which is added to the prestress present in phase 4. As a consequence, the concrete workpiece is prestressed according to the invention, wherein, as mentioned, the specific value of the compressive stresses prevailing in the concrete depends on the cross sections of the concrete and reinforcement selected by the expert in a specific instance. In the present specimen (see FIG. 4, curve 26) with the concrete cross section of 40×40 mm and two reinforcing rods each with a diameter of 8 mm, the prestress measures 30 MPa.

The concrete indicated above and a reinforcement comprised of B450C steel with a tensile strength of >540 MPa yielded the following values in a test:

| Time | Creep UHPC | Creep coefficient steel | $\alpha_T$ Steel ($\times 10^{-6}$) | $\alpha_T$ Steel ($\times 10^{-5}$) | Compressive strength UHPC (MPa) | Bending tensile strength concrete work-piece (MPa) |
|---|---|---|---|---|---|---|
| $t_1$ | — | 0.2 | 11.4 | — | — | — |
| $t_2$ | 0.5 | 0.2 | 11.4 | 16.0 | 80 | 70 |
| $t_3$ | 0.5 | 0.23 | 11.2 | 12.5 | 95 | 80 |
| $t_4$ | 0.2 | 0.23 | 11.2 | 12 | 200 | 175 |
| $t_5$ | 0.1 | 0.3 | 12.6 | 10.5 | 240 | 180 |
| $t_6$ | 0.1 | 0.3 | 12.6 | 10.5 | 300 | 190 |
| $t_7$ | 0.1 | 0.2 | 11.4 | 10.5 | 370 | 220 |

As evident from the table, the reinforcement is also affected by the thermal treatment. In addition to the cross sections, the expert can also adjust the properties of the concrete and reinforcement to each other for a specific case through the selection of materials, thereby resulting in the desired prestress.

In summation, the fresh concrete in another embodiment of the invention is adjusted or its materials are selected in terms of type and quantity in such a way that its temperature expansion coefficient $\alpha_T$ is larger than that of the reinforcement at least during a first phase of heating, which already leads to a first prestress in the heating process that balances out the negative effect of the hydrating concrete shrinking, and also can yield "double" the prestress in conjunction with the prestress achieved in the cooling process. The fresh concrete is then further adjusted so that its temperature expansion coefficient becomes smaller as the result of the heating, preferably in the region of the elevated temperature.

Furthermore, the fresh concrete in one embodiment is quartz sand-based, and preferably exhibits silica dust, which gives it a higher temperature coefficient than the (here steel) reinforcement, but the latter becomes smaller during subsequent thermal treatment owing to the structural change. The quartz sand-based concrete is especially preferably fiber reinforced, which leads to an even better bending tensile strength, see the description below. Let it be noted here that, in view of the wide variety of materials in the area of concrete production, the aforementioned quartz sand-based fresh concrete is especially suited for the use according to the invention of the structural change with the accompanying reduction in the thermal expansion coefficient, although the expert can also utilize other suitable concrete mixtures.

As a result, the fresh concrete in a preferred embodiment is quartz sand-based, and exhibits silica dust, a liquefier and a shrinkage reduction agent, wherein the fresh concrete preferably also has fibers, especially preferably steel fibers, added to it, and wherein the reinforcement very especially preferably exhibits steel elements designed for positive connection with the hydrated concrete.

Adding fibers to the fresh concrete, i.e., using a UHCP concrete for manufacturing a prestressed concrete workpiece according to the invention, yields a synergy: according to the invention, not just $\sigma_{el}$ (stage I on FIG. 1) is then higher, so too is the difference between $\sigma_{el}$ and $\sigma_{pl}$ (stage II on FIG. 1), the advantage being that the limit at which a prestressed concrete workpiece according to the invention will fail has been relevantly elevated not just by the higher elastic deformability, but by the also higher plastic deformability as well. This is because, apart from the crack formation initially stopped by the fibers in stage II, the prestress-inducing reinforcement continues to absorb tension as before, so that crack formation, to the knowledge of the applicant, can no longer be inhibited by the fibers only at an even higher tensile stress, or the fibers are pulled out of the surrounding concrete.

With regard to the temperature profile, as explained, the concrete workpiece is heated to an initial temperature prior to being heated to the elevated temperature and there hydrated, preferably at least to a hardness at which a relative displacement between the concrete and reinforcement due to the varying temperature coefficients in the temperature range of the entire continued thermal treatment is essentially only possible given crack formation in the concrete. In this case, the maximum possible prestress can be realized that can be achieved with the specific concrete mixture in conjunction with the specific reinforcement that exerts the prestress.

Tests have shown that the initial temperature is especially preferably 70° C. or higher for quartz sand-based concrete mixtures, and further especially preferably lies between 85° C. and 120° C., very especially preferably at 90° C., so as to combine the parameters "continuing hardness (hydration)" in conjunction with the "continuing prestress (higher thermal expansion coefficient of the concrete)" and "shrinkage" as optimally as possible, so that, at the end of phase 2, the concrete workpiece according to the invention is still as prestressed as possible despite the shrinkage, and is hard enough for the required adhesion to the reinforcement during the subsequent heating to the elevated temperature.

In one embodiment, the elevated temperature lies between essentially 50° C. and 400° C., and preferably in a temperature range of between 250° C. and 350° C., especially preferably at essentially 300° C. The achievable prestress is slight at below 50° C., and not favorable for metal reinforcements in the interval up to 250° C., since glass fiber-reinforced reinforcement elements may be sparingly temperature resistant.

At above 400° C., cooling may stretch metal, for example steel, reinforcements up to the stretching limit area, so that an elevated temperature of above 400° C. hardly makes sense. Accordingly, an elevated temperature ranging between 250° C. and 350° C. is preferred in particular for steel reinforcements, with 300° C. being especially preferred in the material combination according to the description for FIG. 3.

As mentioned above, the concrete workpiece in a preferred embodiment is kept in the elevated temperature region until inner stresses preferably of the concrete (but also of the reinforcement) have been essentially degraded by creep.

Figure 4:
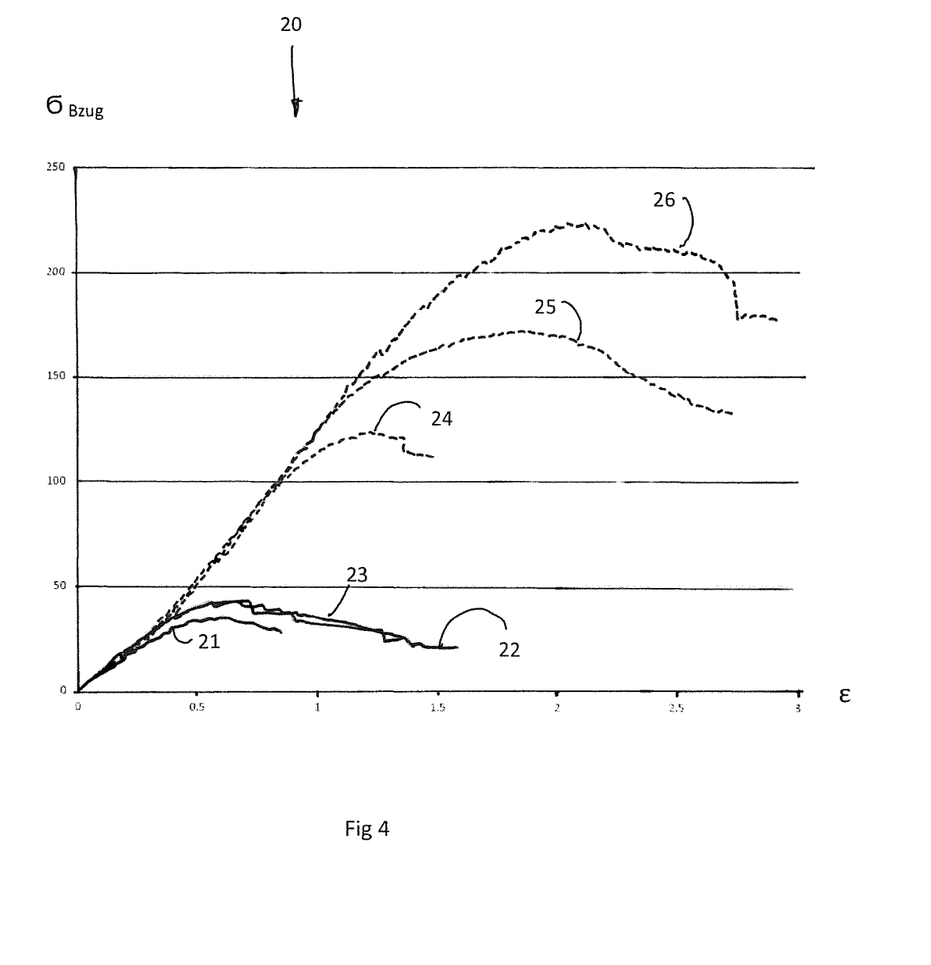
FIG. 4 shows a stress/strain diagram for the bending test on three conventional and three inventive specimens.

FIG. 4 shows a stress-deflection diagram 20, wherein the bending tensile stress $\sigma_{Bzug}$ is plotted on the vertical axis, and the resulting expansion $\varepsilon$ is plotted on the horizontal axis. Curves 21 to 26 show the bending tensile behavior for six different specimens, all with the same dimensions of 40×40×160 mm in a 3-point bending tensile test.

Curves 21 to 23 relate to specimens without prestress according to the invention, i.e., without the reinforcement that generates prestress according to the invention, curves 24 to 26 to a reinforcement consisting of B450C steel (tensile strength>540 MPa) in the form of two tie rods with a diameter of 8 mm, which exhibit the usual ribs on the surface, and run longitudinally in the specimen, parallel next to each other and toward the floor of the specimen, so that their upper side lies at approx. one third the height of the specimen, and roughly one third of the specimen width remains between them.

The following overview shows how the specimens were fabricated:

| Curve | Reinforcement for prestressing | Material | Thermal treatment |
| --- | --- | --- | --- |
| 21 | None | UHPC | None |
| 22 | None | UHPC | 90° C.-72 h |
| 23 | None | UHPC | 90° C.-72 h + 300° C.-12 h |
| 24 | 2 rods, diameter 8 mm | UHPC | None |
| 25 | 2 rods, diameter 8 mm | UHPC | 90° C.-72 h |
| 26 | 2 rods, diameter 8 mm | UHPC | 90° C.-72 h + 300° C.-12 h |

As evident here, only a thermal treatment of UHPC concrete (i.e., fiber-reinforced concrete) without the reinforcement according to the invention has a slight, here negligible influence, with the maximum elastic bending tensile stress remaining under 45 MPa (curves 21 to 23). During reinforcement with the two 8 mm rods, the maximum elastic bending tensile stress expectedly reaches considerably higher values of nearly 100 MPa (curve 24), which can be increased to 130 MPa via thermal treatment with an elevated temperature of 90° C. (curve 25), and to approx. 190 MPa via thermal treatment with an initial temperature of 90° C. and an elevated temperature of 300° C. (curve 26). Let it be noted that the table to FIG. 3 reflects the data for manufacturing the specimen, the bending tensile strength of which is represented by curve 26.

As mentioned above, it is here remarkable that not just the elastic range (stage I on FIG. 1) is markedly elevated according to the invention, but also the plastic range (stage II on FIG. 1).

Figure 5:
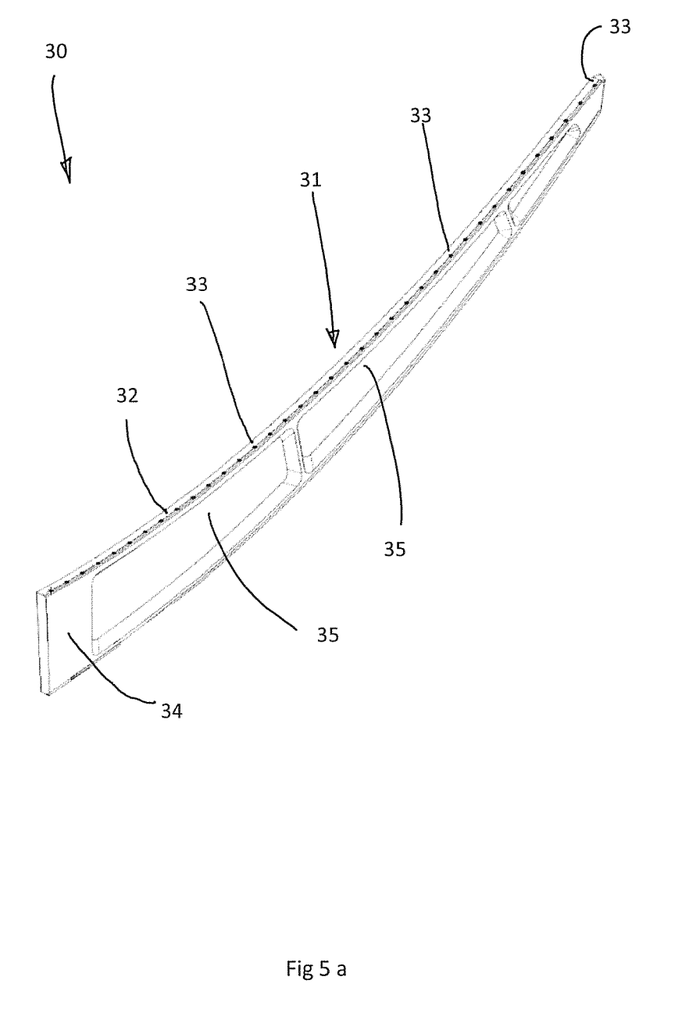
FIG. 5 shows an example of a prestressed concrete carrier according to the invention.

FIG. 5a shows a carrier 30 fabricated according to the invention with a reinforcement placed therein that generates the prestress, and exhibits a duplicated metal tie rod 32 with molded-in thickened portions 33, which yield a positive connection with the surrounding concrete 34, which essentially establishes the necessary adhesion between the reinforcement 31 and concrete 34. To simplify the depiction, the concrete 34 shown is transparent, thereby clearly revealing the position and formation of the reinforcement 31. Openings 35 in the carrier 30 help give it a lean and above all lightweight design. The reinforcement 31 is fully recessed. This yields a concrete workpiece prestressed by a recessed reinforcement, fabricated based on the method according to the invention, wherein the reinforcement lies completely in its interior, and its surface is cast as a single piece all around.

FIG. 5b shows another carrier 40 fabricated according to the invention with a reinforcement 41 that generates the prestress, which on the one side of the carrier is designed as an outer plate 42, and on the other side of the carrier as a recessed bracket 43, so that the prestress is once again conveyed to the concrete essentially by way of a positive connection via the outer plate 42 and bracket shape. The concrete 44 is once again shown transparently, thereby clearly revealing the position and formation of the reinforcement. For example, the outer plate 42 makes it possible to join the carrier 40 with another structure, for example via bolting or welding.

This results in a concrete workpiece prestressed by a recessed reinforcement, fabricated based on the method according to the invention, wherein the surface of the reinforcement is designed as a tie rod, which is supported against the concrete and preferably designed as a connecting element to an adjoining structure. The section of the reinforcement designed as a tie rod cannot be adjusted according to the invention, but is rigidly secured to the other sections of the reinforcement, so that it does not serve to generate subsequent prestress, which according to the invention is achieved via thermal treatment.

The reinforcements 31, 41 in the embodiments shown preferably have a metal design, but can also consist of a nonmetallic material, for example be glass fiber-reinforced, so that the reinforcement that produces the prestress exhibits at least one carbon fiber-reinforced and/or one glass fiber-reinforced tensile element.

The expert can provide a positive connection, a frictional connection or even an integral connection or combinations thereof in specific instances for the necessary adhesion with the concrete. For example, it is possible to provide the reinforcement with a hot-melt adhesive, which then preferably cures at the elevated temperature (or even at an initial temperature), thereby producing a solid connection between the reinforcement and concrete.

FIG. 5c shows two examples for a prestress-inducing reinforcement in the form of fibers, which can be mixed into the concrete, specifically a fiber 50 along with a fiber 55, which both exhibit no uniform surface according to the invention, but rather are provided with elevations, for example suitably arranged bumps 51, or for example disks 56 provided at the ends for establishing a positive connection with the concrete. Such fibers 50, 55 differ from fibers conventionally used in fiber concrete, and bring about an improvement in the bending tensile strength analogously to the difference between curves 21 to 23 and curves 24 to 26 on FIG. 4.

In an embodiment of the method according to the invention, it turns out that the reinforcement exhibits fibers whose surface is designed to establish a positive connection with the concrete, and preferably is provided with bumps or transversely protruding, disk-like elevations running all around. In general, the expert can in specific instances provide the surface of the reinforcement with elevations and/or depressions according to the invention, so that the latter are positively connected with the surrounding, hydrated concrete in the direction of prestress, and wherein the reinforcement preferably exhibits steel elements.

Figure 6:
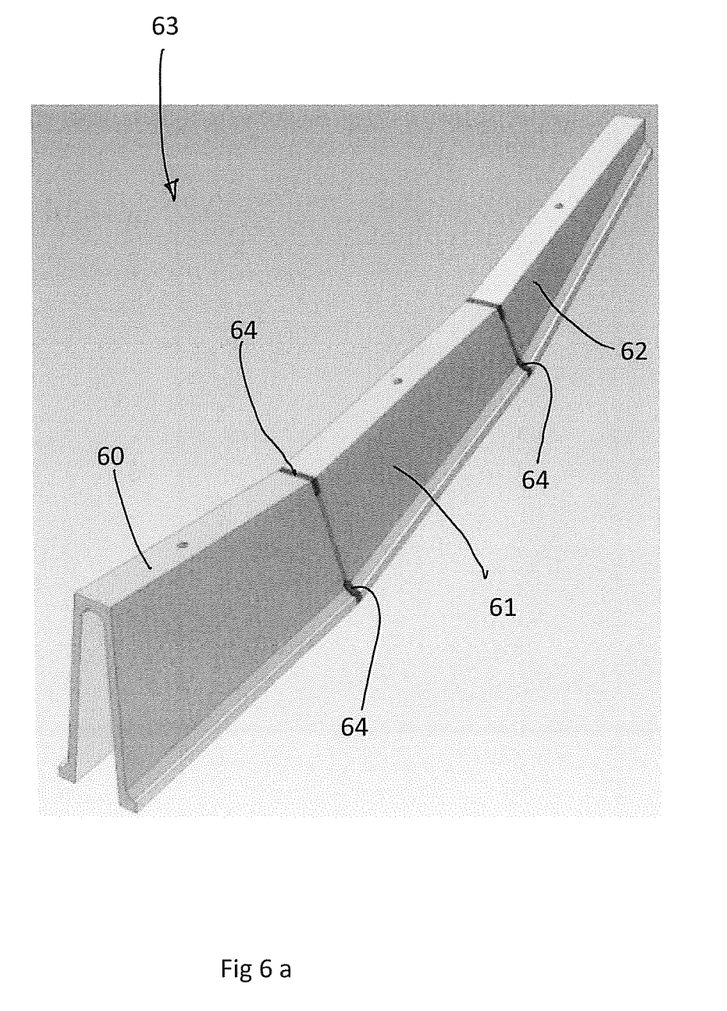
FIGS. 6a to 6c show three other examples for concrete workpieces according to the invention.

FIG. 6a exemplarily shows a carrier arm 63 fabricated out of three concrete workpieces 60 to 62 according to the invention, wherein the concrete workpieces 60 to 62 are joined together via anchor plates 64, and wherein the prestress-generating reinforcements have been omitted so as not to encumber the figure. Even though comprised of concrete, the carrier with a u-shaped cross section is highly loadable, while being intricate and ultimately cheap to manufacture.

FIG. 6b exemplarily shows a supporting structure 68 for a round solar collector (dish collector), which is made out of interconnected concrete workpieces according to the invention, first out of carrier arms 61 according to FIG. 6a and then carriers 65 in the shape of a cross. The reinforcements have been omitted so as not to encumber the figure.

In all concrete workpieces, the expert can conceive the prestress-generating reinforcement according to the invention in an optimal fashion to reflect the strength of the supporting structure to be achieved, and thus realize a high-strength, lightweight and at once favorable construction that has been improved by comparison to prior art.

FIG. 6c exemplarily shows a concrete workpiece according to the invention, here a centrally arranged stand 70 for a dish collector, wherein the prestress-generating reinforcements have been omitted so as not to encumber the figure.

A comparison with other materials that can be used in fabricating the stand 70 reveals as follows.

| Material | Density $\rho$ (kg/m3) | E modulus (GPa) | $\alpha T$ | Weight (kg) | Costs (EUR) |
|---|---|---|---|---|---|
| Aluminum | 2700 | 70 | $22 \times 10^{-6}$°/K | 7 | 130 |
| Steel | 7850 | 210 | $12 \times 10^{-6}$°/K | 25 | 80 |
| UHPC | 2460 | 45.6 | $11 \times 10^{-6}$°/K | 14 | 50 |
| UHPC with reinforcement according to invention | 2820 | 62.7 | $11 \times 10^{-6}$°/K | 12 | 55 |

Therefore, it is evident that a concrete workpiece, here based on the example of the support 70, can according to the invention achieve the strength of an aluminum structure at half the cost, which opens up new areas of application for the concrete.

Finally, let it be noted that the expert can freely combine the configuration of the reinforcement and material composition in relation to the specific case at hand so as to arrive at an optimal design for the desired prestressed concrete workpiece.

As a result of thermal treatment, the concrete is essentially completely or nearly completely hydrated. Accordingly, when heated to above 100° C., preferably to 105°, the concrete, and thus the concrete workpiece, loses less than 5% of its weight, preferably less than 3.5% of its weight, especially preferably essentially no weight, which distinguishes it from prestressed concrete workpieces of a conventional kind.

The invention claimed is:

1. A method for manufacturing a prestressed concrete workpiece formed from fresh, quartz sand-based concrete and a steel reinforcement, the method comprising:
generating the prestress by a thermal treatment
in which the fresh concrete and reinforcement are heated to an elevated temperature and then cooled, the fresh concrete being selected to comprise a silica dust in such a way that the thermal expansion coefficient of the fresh concrete transitions from higher to smaller than that of the reinforcement during said cooling, and the concrete and reinforcement adhering to each other in the cooling process;
at least partially hydrating the fresh concrete in the cooling process, the reinforcement expanding owing to different thermal expansion coefficients between the concrete and the reinforcement provided during said cooling; and
elevating the temperature of the fresh concrete and reinforcement for said heating in such a way and hydrating the concrete in the cooling process to an extent that the prestress is formed by the reinforcement after said cooling,
wherein the thermal expansion coefficient of the fresh concrete becomes smaller as the result of the heating.

2. The method according to claim 1, wherein the surface of the reinforcement is geometrically designed in such a way that a positive connection arises with a surrounding region of the at least partially hydrated concrete in the direction of the prestress.

3. The method according to claim 1, wherein the surface of the reinforcement is designed in such a way that a frictional connection arises with a surrounding region of the at least partially hydrated concrete in the direction of the prestress.

4. The method according to claim 1, wherein the surface of the reinforcement is designed in such a way that an integral connection arises with a surrounding region of the fresh concrete in the direction of the prestress and in the form of a hot-melt adhesive layer which is cured through exposure to the elevated temperature.

5. The method according to claim 1, wherein the thermal expansion coefficient of the fresh concrete is larger than that of the reinforcement at least during a first phase of the heating.

6. The method according to claim 1, wherein the fresh concrete is a quartz sand-based mixture comprising water and steel fiber reinforcement.

7. The method according to claim 1, wherein the fresh concrete comprises the silica dust, a liquefier, and a shrinkage reduction agent, wherein fibers are also added to the fresh concrete, and wherein the reinforcement exhibits steel elements designed for positive connection with the hydrated concrete.

8. The method according to claim 1, wherein the fresh concrete is partially hydrated before said heating to the elevated temperature so as to form a first dimensional stability thereof in which the fresh concrete comprises a compressive strength between 20 MPa and 60 MPa.

9. The method according to claim 1, wherein the fresh concrete is heated to an initial temperature prior to said heating to the elevated temperature and there hydrated, at least to a hardness at which a relative displacement between the fresh concrete and reinforcement due to the varying temperature coefficients in the temperature range of the entire thermal treatment process is essentially only possible given crack formation in the concrete.

10. The method according to claim 9, wherein the initial temperature is at least 70° C.

11. The method according to claim 10, wherein the initial temperature is in the range of 85° C. to 120° C.

12. The method according to claim 1, wherein the elevated temperature lies between essentially 70° C. and 400° C.

13. The method according to claim 1, wherein a region of the elevated temperature is held until inner stresses in the fresh concrete have been essentially degraded by creep.

14. The method according to claim 1, wherein said heating measures 0.2° C./min and/or said cooling measures 0.2-0.4° C./min.

15. The method according to claim 1, wherein the surface of the reinforcement is provided with elevations and/or depressions so that said elevations and/or depressions are positively connected with a surrounding region of the fresh concrete in the direction of prestress, and wherein the reinforcement comprises steel elements.

16. The method according to claim 1, wherein the reinforcement further comprises at least one carbon fiber-reinforced and/or a glass fiber-reinforced tensile element.

17. The method according to claim 1, wherein the reinforcement comprises fibers whose surface is designed to establish a positive connection with the concrete, and is provided with bumps or transversely protruding, disk-like elevations running all around.

18. The method according to claim 1, wherein the fresh concrete comprises a mixture of water with the silica dust.

19. The method according to claim 1, wherein the fresh concrete is a fiber-reinforced concrete mixture.

20. The method according to claim 1, wherein the expansion coefficient of the fresh concrete becomes smaller in the region of the elevated temperature.

* * * * *